United States Patent
Ricketts et al.

(10) Patent No.: US 7,811,161 B1
(45) Date of Patent: Oct. 12, 2010

(54) CORN COB COLLECTION DEVICE WITH STOWABLE CONVEYOR SYSTEM HAVING POSITIVE DE-HUSKING CAPABILITY

(75) Inventors: Jonathan E. Ricketts, Ephrata, PA (US); Joshua D. Werning, Mt. Wolf, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/546,000

(22) Filed: Aug. 24, 2009

Related U.S. Application Data

(60) Provisional application No. 61/216,521, filed on May 18, 2009.

(51) Int. Cl.
*A01F 11/06* (2006.01)
*B02B 3/00* (2006.01)

(52) U.S. Cl. .............................. 460/26; 460/23; 56/16.6

(58) Field of Classification Search ................... 460/26, 460/23, 114, 115, 42, 44; 56/340.1, 327.1, 56/14.5, 14.6
See application file for complete search history.

(56) References Cited

U.S. PATENT DOCUMENTS

| | | | | |
|---|---|---|---|---|
| 2,037,491 A | * | 4/1936 | Wagoner | 56/401 |
| 2,619,967 A | * | 12/1952 | Bond | 460/34 |
| 3,088,261 A | * | 5/1963 | Lagouarde | 56/13.9 |
| 3,298,162 A | * | 1/1967 | Medd | 56/13.9 |
| 3,317,064 A | * | 5/1967 | Fingerut | 406/41 |
| 3,680,291 A | * | 8/1972 | Soteropulos | 56/14.3 |
| 3,705,483 A | * | 12/1972 | Jarrell et al. | 56/13.5 |
| 3,721,075 A | * | 3/1973 | Weiberg | 56/13.5 |
| 3,889,796 A | * | 6/1975 | Baily et al. | 198/301 |
| 4,121,778 A | * | 10/1978 | Quick | 241/79 |
| 4,157,005 A | * | 6/1979 | Orlando et al. | 56/228 |
| 4,287,707 A | * | 9/1981 | Persoons et al. | 56/12.8 |
| 4,759,680 A | * | 7/1988 | Simpson, III | 414/418 |
| 4,943,260 A | * | 7/1990 | Fossum | 460/96 |
| 4,965,993 A | * | 10/1990 | Butler et al. | 56/327.1 |
| 5,042,240 A | * | 8/1991 | Rocca et al. | 56/16.6 |
| 5,528,890 A | | 6/1996 | Gray et al. | |
| 5,799,474 A | * | 9/1998 | Ingram | 56/14.5 |
| 5,865,675 A | | 2/1999 | Meester | |
| 5,941,768 A | | 8/1999 | Flamme | |
| 5,964,081 A | * | 10/1999 | Ingram | 56/14.5 |

(Continued)

FOREIGN PATENT DOCUMENTS

JP 5168324 7/1993

(Continued)

*Primary Examiner*—Árpád Fábián-Kovács
(74) *Attorney, Agent, or Firm*—Michael G. Harms; Patrick M. Sheldrake

(57) ABSTRACT

A cob collection device for use with a corn harvester, includes a conveyor system including a portion for positively removing or cleaning attached husks from the cobs after removal of corn therefrom by the harvester, the conveyor system including an upwardly inclined conveyor portion operably movable in cooperation with the collection device for distributing delivery of cobs thereto, the cob collection device having a wall portion including an aperture for receiving the inclined conveyor portion, and a door for closing the aperture when the conveyor is removed, allowing unloading of the collection device, and stowage of the conveyor in a compacted manner to facilitate travel under bridges, utility wires, doorways and the like.

6 Claims, 9 Drawing Sheets

U.S. PATENT DOCUMENTS

| | | | |
|---|---|---|---|
| 6,050,073 A | 4/2000 | Nevarez, Sr. | |
| 6,358,141 B1 | 3/2002 | Stukenholtz et al. | |
| 6,632,135 B2 * | 10/2003 | Matousek et al. | 460/23 |
| 7,166,027 B2 | 1/2007 | Messenger | |
| 2004/0259612 A1 | 12/2004 | Ramon et al. | |
| 2008/0261671 A1 | 10/2008 | Stukenholtz et al. | |
| 2009/0095662 A1 | 4/2009 | Redekop et al. | |
| 2009/0104952 A1 | 4/2009 | Redekop et al. | |
| 2009/0124309 A1 | 5/2009 | Redekop et al. | |
| 2009/0137295 A1 | 5/2009 | Redekop et al. | |

FOREIGN PATENT DOCUMENTS

| | | |
|---|---|---|
| JP | 6078627 | 3/1994 |

* cited by examiner

CORN COB COLLECTION DEVICE WITH STOWABLE CONVEYOR SYSTEM HAVING POSITIVE DE-HUSKING CAPABILITY

This application claims the benefit of U.S. Provisional Application No. 61/216,521, filed May 18, 2009.

U.S. Provisional Application No. 61/216,521, filed May 18, 2009, is incorporated herein in its entirety by reference.

TECHNICAL FIELD

This invention relates generally to a cob collection device for use with a corn harvester, which device more particularly incorporates a conveyor system providing a capability for positively removing or cleaning attached husks from the cobs, and which is operably movable in cooperation with the collection device for distributing delivery of cobs without husks thereto and for stowing the conveyor in a compacted manner to facilitate travel under bridges, utility wires, doorways and the like.

BACKGROUND OF THE INVENTION

Presently, there is an increased demand for corn cobs as a feedstock for cellulosic ethanol, as well as other uses. As a result, there is heightened interest in collecting corn cobs during corn harvest. There is also concern by some that cob collection may reduce soil nutrient content. In this regard, crop residue or stover, e.g., corn stalks, leaves, husks and cobs, are traditionally left on the field after harvest, and break down over time to replenish soil nutrients. If a component of the stover, e.g., cobs is instead collected, nutrient levels could be lowered as a result. To mitigate this concern, some consider it desirable when collecting cobs, to collect only the cobs, that is, clean cobs with substantially all residual husks, leaves and stalks removed, and return the other stover to the field. Thus, it is sought to have a cob collection device and conveyor adapted for operation in connection with a corn harvester, which incorporates an ability to separate or clean the cobs from the other stover, including removing husks and the like attached to the cobs, and return the other stover to the field or another location. It is also desirable for the collected cobs to be as compact as possible, e.g., without attached husks and the like, so as to maximize the amount of cobs that the collection device and subsequent containers can hold. Still further, for some techniques for producing ethanol from corn cobs, the presence of other stover, e.g., husks and the like, is undesired, and for a load of cobs of a given volume, the amount of compensation paid will be reduced if significant stover is present.

Numerous apparatus have been proposed for use in connection with cob collection devices, for cleaning or separating cobs from the other stover. To illustrate, prior to the early 1960's, the common corn harvesting practice involved picking the ears of corn in the field, removing husks from the ears, and transporting the ears still containing the corn kernels to a corn crib, and later shelling the corn off of the cobs at a stationary sheller. This harvesting procedure has been almost entirely replaced by modern self-propelled combine type harvesters, which separate and collect the corn kernels, and discharge the cobs and other stover onto the field.

Combines which harvest the corn and separate the kernels from the cobs and other stover or residue, then discharge the cobs and other stover onto the field, are now the industry standard. More recently, devices for collecting cobs discharged from combines have been developed. Several of such known devices have variously utilized a towed cart or wagon for receiving and holding the cobs, and a conveyor system for conveying the cobs from the combine to the cart or wagon. Some of the cob collection devices also include apparatus for separating the cobs from the other stover or residue, mainly using air flow. Reference in this regard, Flamme U.S. Pat. No. 5,941,768, issued Aug. 24, 1999, which discloses a cob collection unit pulled behind a combine to collect on a first conveyor all the residue discharged from the combine, with a separation unit behind the conveyor including a second conveyor, and utilizing a fan to suck the stover from the cobs as they are released from the top of the second conveyor and to blow the stover back onto the field. Redekop et al. U.S. Patent Publication Nos. 20090095662 published Apr. 16, 2009; 20090104952 published Apr. 23, 2009; and 20090124309 published May 14, 2009, disclose a pulled cob collection unit, which utilizes a sequential series of inclined belt conveyors, and blower or suction fans for directing air through the discharged material as it falls from the upper end of one conveyor onto a lower end of the next conveyor, such that the heavier cobs are to continue to the next conveyor and the lighter stover or residue will be carried away by the air flow, with the cobs being conveyed into a collection tank by a further conveyor or conveyors.

Reference also Stukenholtz U.S. Pat. No. 6,358,141 issued Mar. 19, 2002, and Redekop et al. U.S. Patent Publication No. 20090137295, which disclose cob collection systems on a combine which utilize on-board bins and cob separation using sieves on the combine itself.

A shortcomings variously of the known cob collection devices and systems, is a lack of a capability for reliably removing husks and/or leaves, or fragments thereof, which still remain attached to the cobs after processing of the cobs through the systems of the combine, including gathering of the corn plants and separation of the corn ears from the stalks by the header, conveying through the feeder, agitation and separation of the kernels from the cobs by the threshing mechanism, and post-threshing handling, including in some cases passage through sieves and other systems designed for separating the cobs from the other residue or stover. Such attached husks and the like are disadvantageous as they increase the volume of the collected cobs, and reduce the ease of conveyance and compactability thereof, such that for a given volume of collected cobs, an undesirable portion of the volume can comprise the husks and the like which can have a lower energy content compared to the cobs alone, and create open spaces or interstices between the collected cobs, which factors can combine to reduce the value of a given volume of the collected cobs, as noted above.

Additionally, various of the known cob collection devices have a limited cob storage capacity or volume. In this regard, in many instances, it will be desirable to maximize the capacity of the cob collection device, within the load carrying or towing capability of the associated harvesting machine or other means of propulsion, which will typically entail maximizing the length and height dimensions of the cob collection device. For instance in this latter regard, it will typically be desirable for the height of the cob collection device to correspond to about that of the combine with which it is used. However, when a larger cob collection device is used, some manner of distributing the cobs within the device may be required, and the device should be adaptable for travel over public thoroughfares, under bridges and utility wires, and through doorways and the like.

Thus, what is sought is a cob collection device or apparatus for operation in association with a harvester, which provides one or more of the capabilities, namely, positively separating or detaching attached husks from the cobs, maximizing cob carrying capacity, and adaptability for travel over public thoroughfares, under bridges and utility wires, and through doorways and the like, and which overcomes one or more of the disadvantages, set forth above.

SUMMARY OF THE INVENTION

What is disclosed is a cob collection device or apparatus for operation in association with a harvester, which provides one or more of the capabilities, namely, positively separating or detaching attached husks from the cobs, maximizing cob carrying capacity, and adaptability for travel over public thoroughfares, under bridges and utility wires, and through doorways and the like, and which overcomes one or more of the disadvantages, set forth above.

According to a preferred aspect of the invention, the cob collection device or apparatus includes a container which is preferably an upstanding wall structure bounding an interior chamber or cavity for receiving and holding a quantity of cobs. The upstanding wall structure includes a predetermined wall having an upper region including an aperture or opening therein. The cob collection device also preferably includes a door configured and movable between a closed position covering the aperture, and an open position uncovering the aperture.

According to another preferred aspect, the cob collection device includes an adjustable conveyor system configured and operable for receiving a flow of the cobs from a harvester, at least some of which cobs typically have some husks, or portions of husks, still attached, as discussed above. The conveyor system has a conveyor portion including apparatus configured and operable for mechanically grasping and detaching the husks from the cobs and disposing of the husks, while conveying the cobs toward the cob collection device. The conveyor system also includes a conveyor portion inclined upwardly and configured and adjustably operable for conveying the cobs without the husks through the aperture of the upper region of the predetermined wall, and distributing the cobs within the interior chamber. In this latter regard, the conveyor portion inclined upwardly is preferably movable through a range of positions between a first position adjacent to the aperture and external to the interior chamber, and a second position extending a predetermined maximum distance into the interior chamber through the aperture, the range of positions including different intermediate positions for distributing the cobs at different locations within the interior cavity.

According to still another preferred aspect of the invention, a mechanism is provided configured and operable for automatically moving the optional door to the closed position when the conveyor portion inclined upwardly is moved to the first position. The mechanism is also preferably operable for moving the door in concert with the movements of the upwardly inclined conveyor portion through the intermediate positions, to enhance the ability to evenly distribute the cobs within the interior chamber, while limiting cob loss through the aperture. The mechanism can be yieldably biasable for this purpose, so as to essentially follow the movements of the inclined conveyor portion. With the conveyor removed from the collection device and the door closed, and with the collection device filled to capacity with cobs, the collection device can be unloaded, as required, such as, but not limited to, by raising and tilting.

As another preferred aspect of the invention, the conveyor system and collection device are carried on a trailer configured for towing behind a harvesting machine, e.g., a combine, for receiving the flow of the cobs therefrom, and the conveyor portion inclined upwardly is pivotable through the range of positions relative to the trailer, e.g., by a suitable actuator such as a fluid cylinder or cylinders.

As still another preferred aspect of the invention, the apparatus for mechanically grasping and detaching the attached husks from the cobs includes a first conveyor having a first end, an opposite second end, and an array of husking rolls extending therebetween defining an upwardly facing surface configured and positioned for receiving the flow of the cobs including husks and conveying the cobs to the second end. Here, it should be noted that unlike de-husking operations wherein the husks are removed from whole ears of corn, prior to removal of the kernels of corn, and wherein apparatus is provided for feeding the whole ears in end-to-end relation as they are de-husked, in the present application, a flow of the cobs, after removal of the corn, and some with remaining husks attached, are being dumped directly onto the first conveyor, in a disordered mixture containing other crop residue. Additionally, it should be noted that the volume of cobs flowing onto the conveyor can be quite large, depending on factors such as corn yield and the size of the corn harvester, e.g., 5 row up to 12 row or more.

With the above factors in mind, the first conveyor is preferably configured for rapidly de-husking a large volume of randomly oriented cobs and cob fragments mixed with a variety of other corn residue or stover. In this regard, each of the husking rolls bounds a gap sufficiently large for passage of the husks therethrough but smaller than the cobs. These gaps are also sufficient for receiving smaller elements of crop residue. Each of the husking rolls is supported for rotation about an axis therethrough and connected to drive apparatus configured for drivingly rotating the husking rolls about the axes, respectively, the husking rolls including husking elements thereon configured such that during the rotation, the elements will positively grasp and detach the husks from the cobs and pull or drive the detached husks through the gaps into a region below the conveyor.

According to yet another preferred aspect of the invention, the husking elements comprise suitable structure for grasping and pulling or otherwise detaching the husks from the cobs, such as, but not limited to, concave regions adapted for receiving the husks as the cobs are conveyed along the conveyor, disposed about outer surfaces of the husking rolls, respectively, and bounded by edges configured for grasping and pulling the husks off of the cobs. Essentially, as the rolls are rotated and the cobs are conveyed therealong, the husks but not the cobs will be received in the concave regions of the rolls, so as to be carried about the rolls into the adjacent gap, the trailing edges of the rolls will then rotate into the adjacent gap to firmly grasp the husks to positively mechanically pull or rip them from the cobs, and carry the husks to the underside of the rolls where the cobs will be released to fall to the field, be blown away, or the like. Other smaller elements of stover, e.g., leaf, stalk, and cob fragments, can also be carried below the conveyor in a similar manner. And, the conveyor system can include other apparatus for removing other loose crop residue or stover intermingled with the cobs, and spreading or distributing the residue over a field, which apparatus can include, but is not limited to, one or more blowers or fans such as disclosed in the prior art, as desired or required for a particular application.

DETAILED DESCRIPTION OF THE INVENTION

Figure 1:
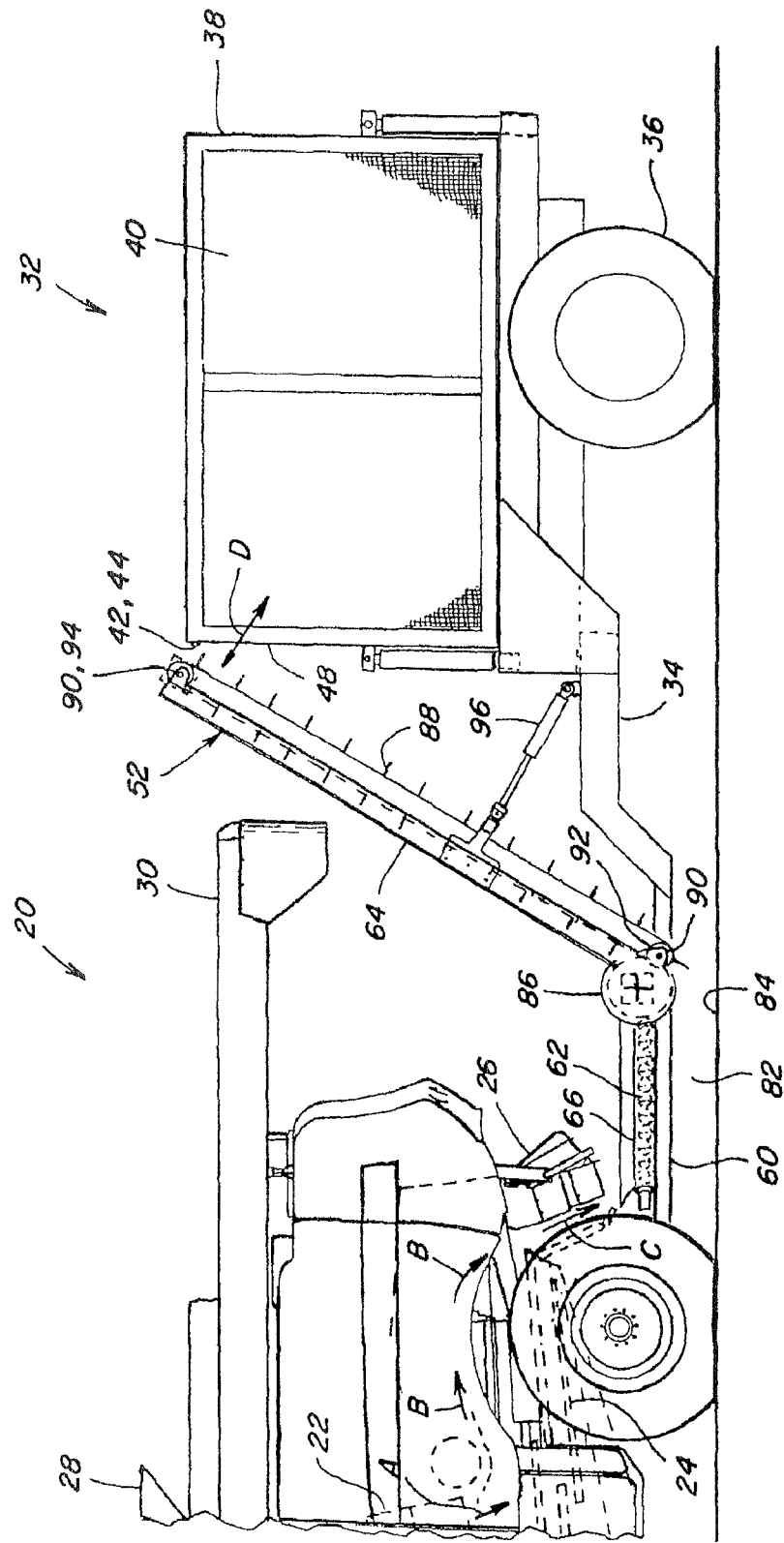
FIG. 1 is a fragmentary side view of a representative agricultural harvesting machine, with a cob collection device and a conveyor system thereof, according to the invention.

Referring now the drawings, in FIG. 1, a representative agricultural harvesting machine 20 is shown, which is a combine constructed and operable in the well known manner for harvesting whole ears of corn from corn plants as the combine travels over a field. Combine 20 includes well known apparatus (not shown) that gathers and conveys the ears of corn into a threshing system 22 within the combine which removes most of the husk surrounding the ears, and the corn kernels from cobs of the ears, and directs a flow of the corn, cobs, or fragments thereof, and other residue or stover, all as generally denoted by arrow A, within a rear chamber of combine 20 to a cleaning system 24 of the combine. At the same time, larger residue such as leaves and the like, are directed within the rear chamber, as denoted by arrow B, to a spreader 26 on the rear end of the combine.

Cleaning system 24 of combine 20 is operable in the conventional manner to separate the cobs and other larger elements of the corn residue or stover from the kernels of corn and smaller elements of residue, and the corn is collected and conveyed into a clean grain tank 28 on combine 20, or other receiver, while the cobs and other larger elements of the residue are discharged from the rear of cleaning system 24, as denoted by arrow C. The clean corn is then unloaded from tank 28 using an unloader conveyor 30 in the conventional manner, by swinging conveyor 30 to a sidewardly extending position (not shown—conveyor 30 being illustrated in a stowed or travel position here).

Figure 2:
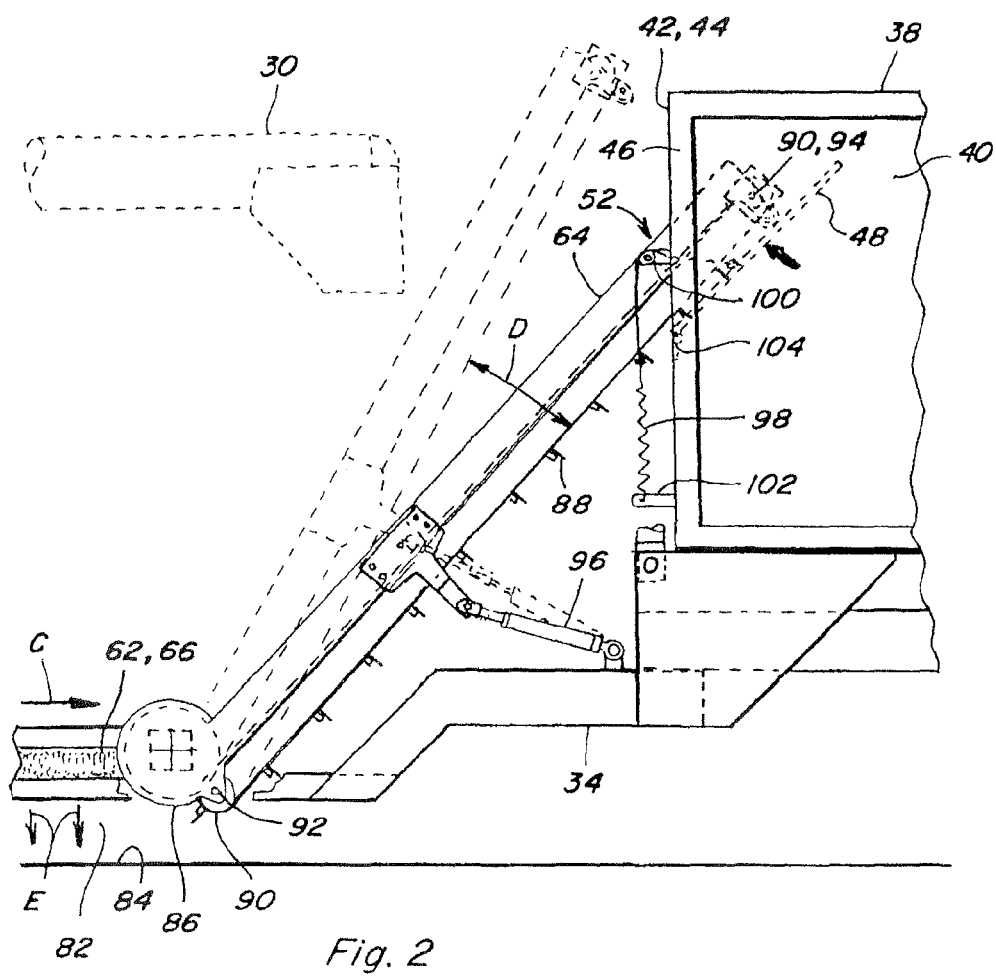
FIG. 2 is another fragmentary side view of the cob collection device, showing an inclined conveyor of the conveyor system thereof in a stowed position extending through an aperture of the device into an interior chamber thereof.
Figure 3:
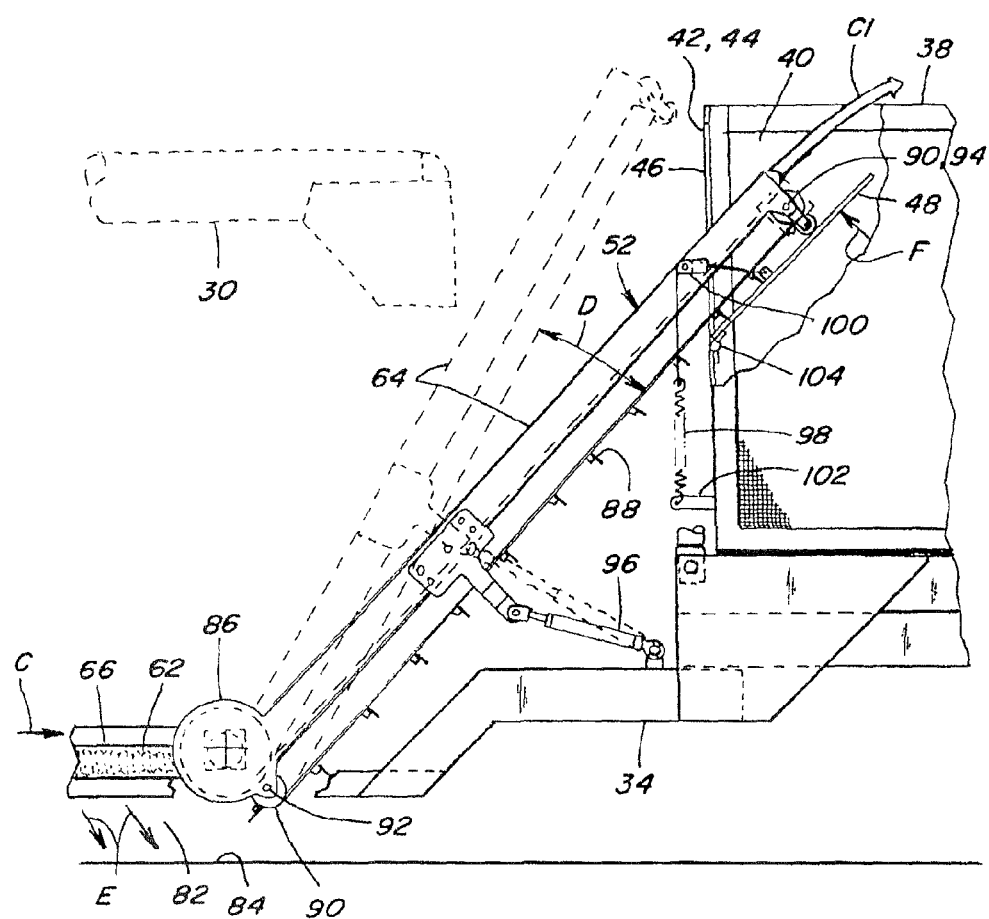
FIG. 3 is another fragmentary side view of the cob collection device with the inclined conveyor in the stowed position, and showing aspects of a door of the device associated with the aperture.

Referring also to FIGS. 2 and 3, a cob collection device 32 is shown, which is constructed and operable according to the teachings of the present invention, for receiving the flow of cobs and other elements of corn residue or stover denoted by arrow C, removing remaining husks attached to the cobs, and collecting the cobs. Here, cob collection device 32 is configured to be located and supported on a trailer 34 suitably supported on wheels 36, or tracks (not shown) for towing by combine 20, although it is likewise contemplated that device 32 could be incorporated into the structure of the harvesting machine with which it is used, e.g., combine 20, self-propelled, or otherwise moved in a manner adequate for receiving a flow of cobs from the harvesting machine.

Figure 7:
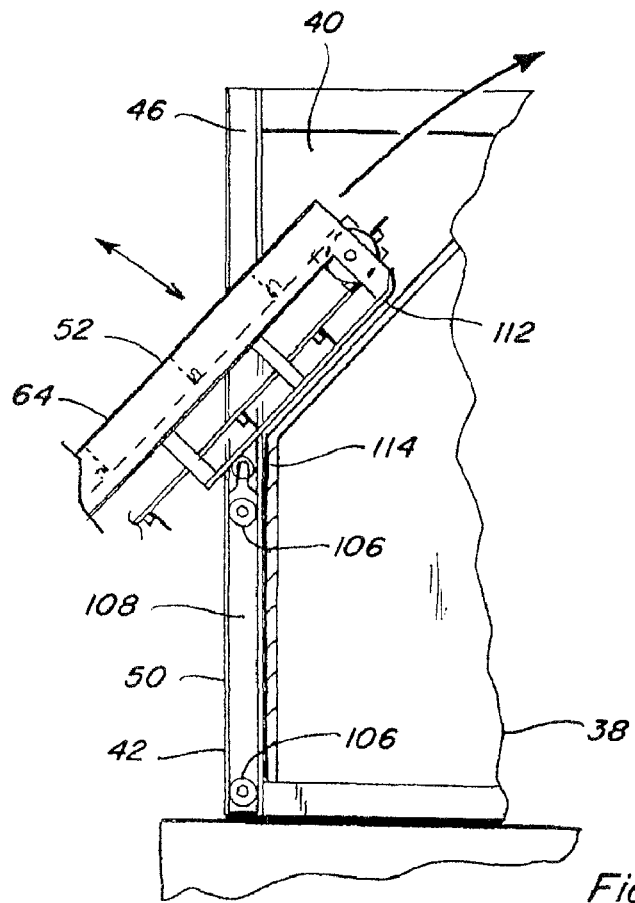
FIG. 7 is a fragmentary side view of the cob collection device showing aspects of the inclined conveyor thereof, and illustrating an alternative door for the aperture.
Figure 8:
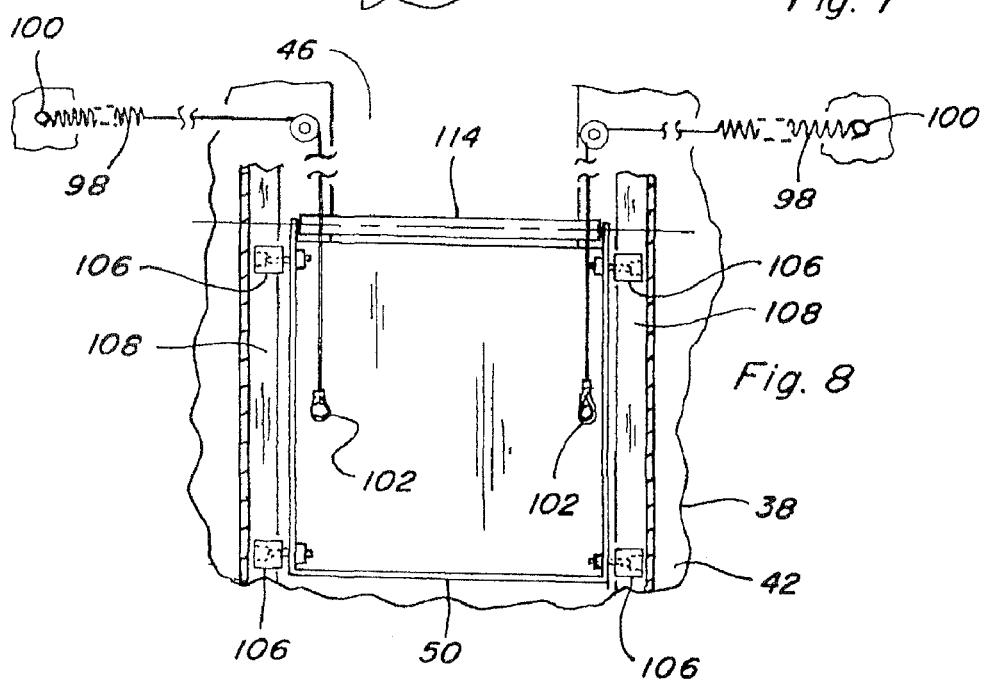
FIG. 8 is a fragmentary end view of the cob collection device and door of FIG. 7, showing additional aspects thereof.

Cob collection device 32 generally includes an upstanding wall structure 38 bounding an interior cavity or chamber 40 adapted for receiving and holding a quantity of cobs. Upstanding wall structure 38 includes a predetermined wall, here a front wall 42, having an upper region 44 including an aperture 46 therein. Cob collection device 32 preferably includes a door 48 (one alternative door 50 is shown in FIGS. 7 and 8) configured so as to be movable between a closed or raised position covering aperture 46 (FIG. 1), and an open position (FIGS. 2, 3, 7 and 8).

Figure 4:
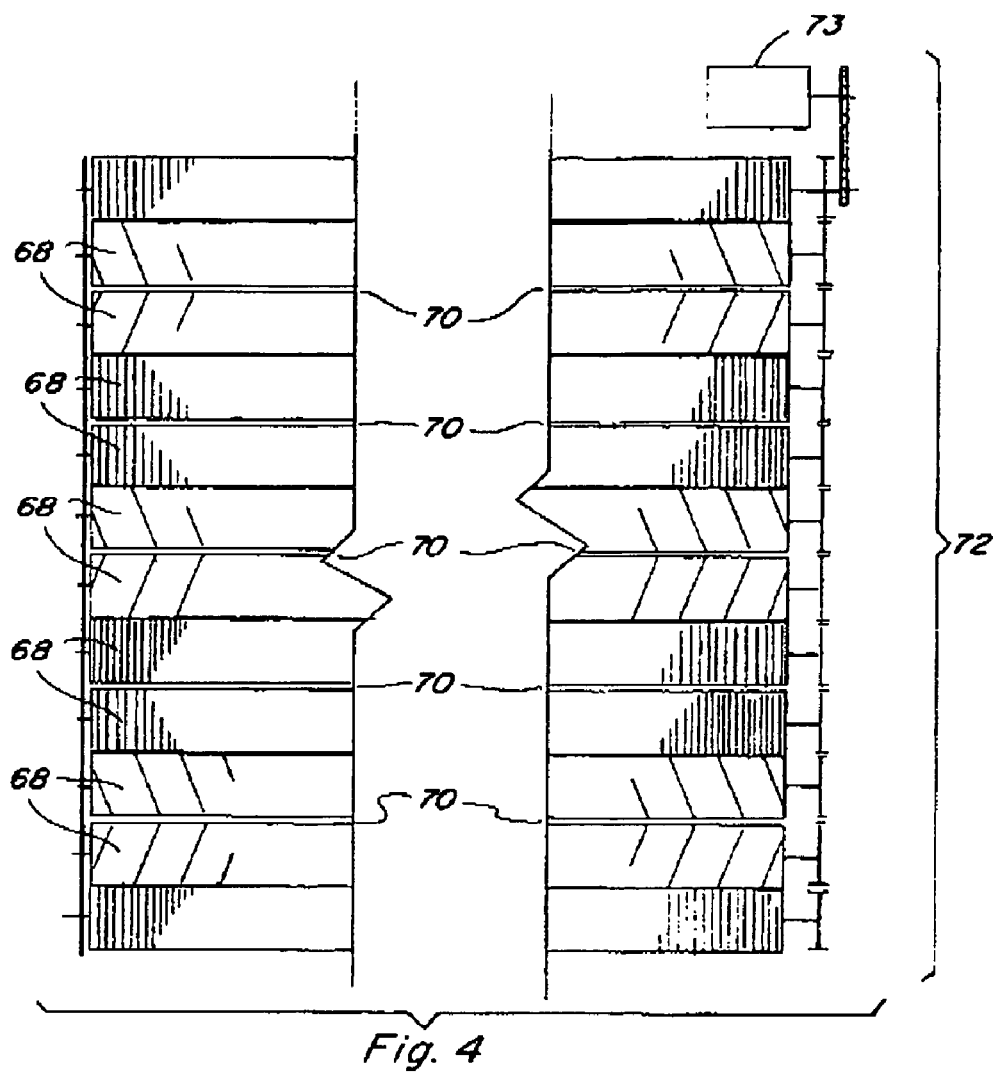
FIG. 4 is a simplified top view of a first conveyor of the device, showing apparatus thereof operable for positively detaching husks from cobs while the cobs are conveyed along the conveyor.
Figure 5:
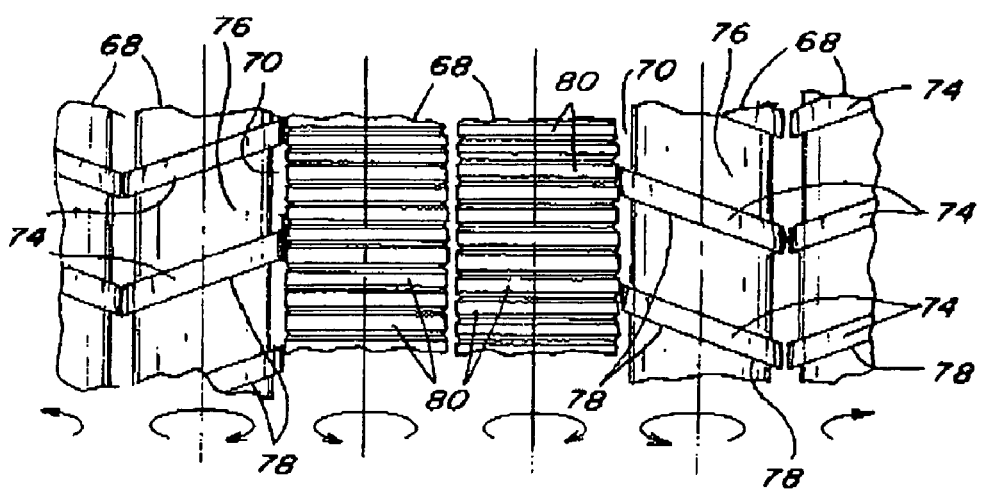
FIG. 5 is an enlarged top view of the conveyor of FIG. 4, showing husking rolls and husking elements of the apparatus operable for positively detaching husks from cobs conveyed over the conveyor.
Figure 6:
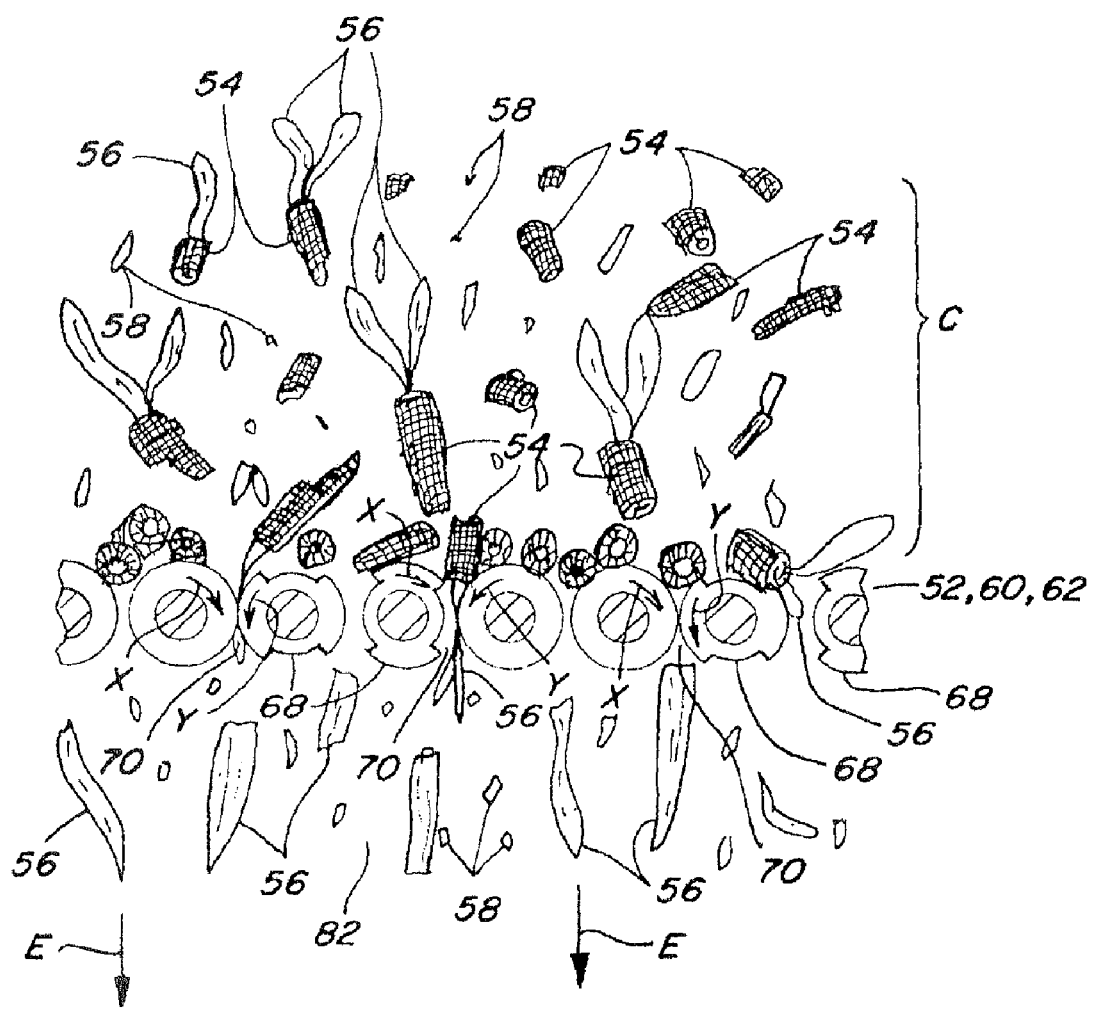
FIG. 6 is an enlarged sectional view of the apparatus of the conveyor of FIG. 4 illustrating conveyance of the cobs and removal of husks therefrom.

Referring also to FIGS. 4, 5 and 6, cob collection device 32 includes an adjustable conveyor system 52 configured and operable for receiving flow of cobs C from combine 20, which will typically include a large number of cobs 54 or fragments thereof, at least some of which initially have some husks 56, or portions thereof, still attached, as illustrated. Also illustrated in flow C are a variety of other elements of corn crop residue or stover, denoted generally by numeral 58, which can include, for instance, remnants of stalks, cobs, kernels, leaves, stalks, and the like. Conveyor system 52 includes a first conveyor 60 including apparatus 62 configured and operable receiving flow C, mechanically grasping and detaching husks 56 from cobs 54 thereof, and disposing of the husks, while conveying cobs 54 to a second conveyor 64. Second conveyor 64 is inclined upwardly from conveyor 60, and is configured and adjustably operable for conveying cobs 54 without at least most of husks 56, accordingly denoted by arrow C1 in FIG. 3, through or over aperture 46 of wall 42, and distributing the cobs within interior chamber 40. Second conveyor 64 is preferably pivotably movable through a range of positions, denoted by arrows D in FIGS. 2 and 3, between a first position shown in dotted lines adjacent to aperture 46 and external to interior chamber 40 (and in solid lines in FIG. 1), and a second position extending a predetermined maximum distance into interior chamber 40 through aperture 42 (FIGS. 2, 3 and 7), the range of positions including different intermediate positions for distributing the flow of cobs C1 at different locations within interior cavity 40.

Referring more particularly to FIGS. 4, 5, and 6, first conveyor 60 is disposed on a forward end of trailer 34, beneath spreader 26 (if present), and in the path of flow C. This is advantageous, as it positions conveyor 60 for receiving substantially all of cobs 54 and other residue 58 discharged from combine 20, and also any crop residue 58 which may fall from spreader 26, and conveyor 60 will have a suitable width for accomplishing this and/or combine 20 can include a tray or pan for facilitating the transfer of the flow C onto conveyor 60, as required or desired. Apparatus 62 essentially comprises a generally flat upwardly facing surface 66 comprising a side-by-side array of elongate husking rolls 68 supported by as suitable framework or other structure on trailer 34, for rotation about longitudinal axes through the respective rolls. Selected adjacent ones of husking rolls 68 bound longitudinally extending gaps 70 therebetween, gaps 70 being sufficiently large for receiving husks 56 and smaller elements of crop residue 58 therein, but not cobs 54. The selected ones of husking rolls 68 are connected to a drive 72 which can include, for instance, a fluid or electric motor 73, connected in driving relation to a drive train including gears, shafts, belts, chains, or the like, operable for counter-rotating the rolls, as denoted by arrows X and Y in FIG. 6.

Figure 9:
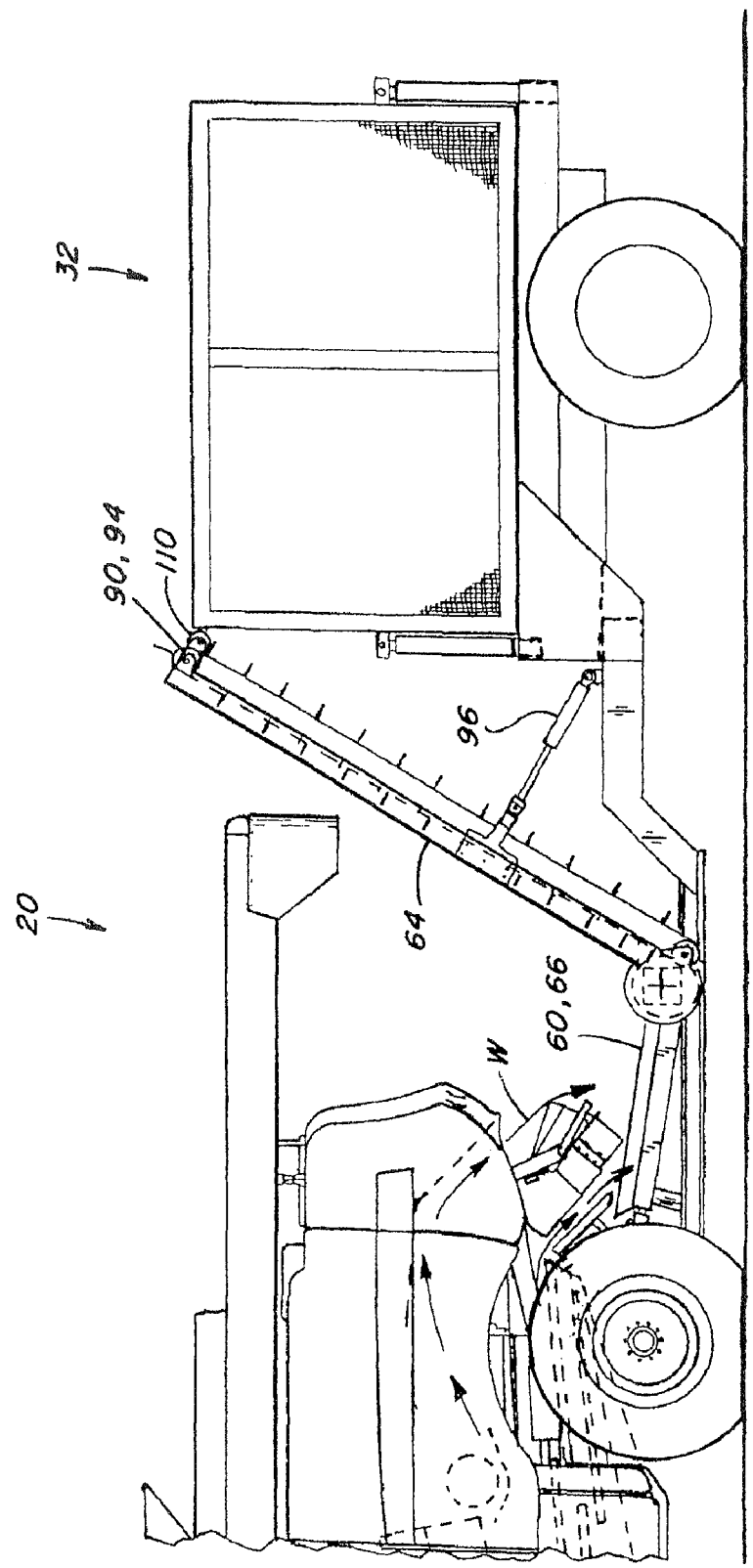
FIG. 9 is another fragmentary side view of the harvesting machine and cob collection device, illustrating the first conveyor at an alternative inclined orientation.

Husking rolls 68 preferably include husking elements 74 on the outer surfaces thereof, configured for operation in cooperation with the adjacent rolls 68, for mechanically grasping and detaching attached husks 56 from cobs 54 as husking rolls 68 are rotated in contact with the cobs. It is contemplated that husking elements 72 can have a variety of configurations, e.g., shapes and features, for grasping and pulling husks 56 from cobs 54, husking elements 72 on some of rolls 68 preferably being configured as longitudinally extending helical concave regions 76 on the outer surfaces of rolls 68, bounded by longitudinally extending, raised helical edges 78, while others of the elements 72 on opposing ones of rolls 68 are preferably configured as annular serrations 80 about the rolls, the opposing husking elements being adapted to cooperatively operate for grasping husks 56 and rapidly pulling them from cobs 54, and downwardly into and through gaps 70, along with any loose residue 58, as the rolls are rotated. The rotation and husking elements 72 can also cooperate so as to act to convey cobs 54 rapidly along surface 66, either alone, or in cooperation with gravity, e.g., by inclining surface 66 downwardly in the conveying direction, as illustrated in FIG. 9, or additional conveyance apparatus (not shown), such as wheels, belts or the like which can be incorporated into surface 66 or disposed thereabove.

As noted above, it should be understood that unlike conventional husking bed applications wherein husks are removed from ears of corn prior to removal of the corn kernels from the cobs, and wherein the ears are conveyed in orderly end to end relation along the husking rolls, here, the corn kernels have already been removed from the cobs and the cobs with remaining attached husks can comprise whole cobs, and/or cob fragments of various sizes, and, individually, will be substantially lighter in weight compared to whole ears of corn. Additionally, as a result of prior processing by combine 20, husks 56 which remain attached to cobs 54 will be oriented in a variety of ways relative to the cobs, including extending sidewardly, backwards, etc., and the husks will likely be tough and/or resilient, stringy, and otherwise hard to detach. Flow of cobs C can also contain a wide variety of other loose residue 58 and will not comprise an orderly end-to-end procession of ears. As a result, husking rolls 68 and associated husking elements 74 are desirably configured to grasp and detach husks 56 from cobs 54, while in a state of agitation, e.g., tumbling and rolling along surface 66 in a variety of orientations, essentially as illustrated in FIG. 6.

The respective gaps 70 between side-by-side rolls 68 preferably extend through conveyor 60 so as to communicate with a region 82 therebelow, which is preferably open to the ground surface 84, such that the detached husks 56, and other elements of crop residue 58 will fall onto ground surface 84, as denoted by arrows E in FIGS. 2, 3 and 6. This is desirable and advantageous, as it provides crop residue coverage for that region of ground surface 84 disposed beneath device 32, crop residue being spread over other regions of ground surface 84 on opposite sides of device 32 by spreader 26, if used. As a result, that portion of flow C remaining on surface 66 of conveyor 60 and conveyed to conveyor 64, then distributed in chamber 40 of wall structure 38, as denoted by arrow C1, will comprise a mix of more cobs 54 and fewer, if any, husks 56, and other residue 58.

Inclined second conveyor 64 is preferably narrower than first conveyor 60, and to facilitate corresponding narrowing of flow C as it transitions to conveyor 64, conveyor system 52 additionally preferably includes a third conveyor 86 disposed adjacent to a rear or second end of first conveyor 60, and a lower forward or first lower end of conveyor 64. Third conveyor 86 preferably spans the width of first conveyor 60 and is an upwardly open helical auger type conveyor, configured and operable for collecting and channeling or gathering flow C onto conveyor 64. Conveyor 86 can be suitably driven, for instance, using drive 72, or a different drive, as desired or required.

Second conveyor 64 is preferably a belt type conveyor, inclined at a relatively steep angle of between about 40 and 70 degrees, to use with a taller upstanding wall structure 38. Conveyor 64 utilizes a slatted endless belt 88 encircling rollers 90 at the lower first end and an upper second end of conveyor 64, and is pivotally mounted at the lower end to trailer 34 or other suitable structure of device 32, by a pivot joint 92, coaxial with or adjacent to the lower roller 90, for movement through the range of positions denoted by arrow D. The slats of belt 88 will have sufficient extent for conveying the cobs in the desired manner, and belt 88 will be driven with sufficient speed to handle the cob flow C1, which can vary as a function of the sized of the header of combine 20, e.g., 5 row to 12 row, and to propel the cobs the required extent into chamber 40 for achieving desired distribution. To provide these capabilities, conveyor 64 is suitable driven by a drive 94, which can be, for instance, a fluid or electric motor, chain or belt drive, or the like. To move conveyor 64 through range of positions D, it is supported for pivotal movement by a suitable actuator 96, which can be, but is not limited to, a fluid cylinder 96 extendable for pivotally raising the conveyor, and retractable for lowering it. Actuator 96 can be controlled by a human operator, for instance from an operator cab of combine 20, or a remote location, or automatically, as desired or required for achieving desired distribution of cobs within chamber 40 of wall structure 38. In this regard, a more elevated position of conveyor 64 will typically be used for distributing flow C1 of cobs within chamber 40 closer to front wall 42, whereas a lower elevation will be used for distributing the flow of cobs closer to the rear end of the chamber, and middle positions will distribute the cobs in a middle region of the chamber.

As noted above, to facilitate positioning of conveyor 64 for distributing the flow of cobs toward the rear end of the chamber, aperture 46 in front wall 42 of wall structure 38 is provided for receiving the upper end of conveyor 64. As also noted, the upper end of conveyor 64 is also receivable in a maximum lowered or stowed position within aperture 46 to reduce the overall height of the conveyor and thus device 32, to facilitate travel under utility lines, bridges and through doorways of buildings. However, it has been found that if aperture 46 is open but conveyor 64 is not in its lowest position, if the level of cobs within chamber 40 is sufficiently high, cobs can be lost through the lower region of the aperture. To prevent this occurrence, front wall 42 preferably includes a door, such as, but not limited to, pivoting door 48 (FIGS. 2 and 3) or sliding door 50 (FIGS. 7 and 8) automatically operable for following movements of door 48 or 50 as it moves through its range of positions, so as to cover the region of aperture 46 beneath the door.

To provide a following capability, door, e.g., 48, 50, is preferably biased upwardly toward conveyor 64. This can be accomplished in any suitable manner, such as, but not limited to, by use of yieldable biasing elements 98 such as tension springs or the like connected to door 48, 50 at connections 100 and connected to suitable structure on wall structure 38 at connections 102, which elements 98 operate to urge door 48 or 50 upwardly against and in following relation to the bottom of conveyor 64, as denoted by arrows F. Here, for illustrative purposes, door 48 is shown connected to wall 42 by a hinge joint 104, and door 50 is supported for vertical movement by rollers 106 connected thereto and captured within vertical opposing C shape channels 108 on opposite sides of aperture 46, to provide the required range of movement of the respective door 48 or 50 for opening to the necessary extent.

To also facilitate a smooth following capability, the lower region of conveyor 64 can include suitable apparatus for contacting door 48 or 50, such as rollers 110 or a skid plate 112. And, in the latter regard, door 50 is shown including a roller 114 positioned to engage skid 112 for smoother movement therebetween. Here, it should be noted that skid plate 112 is spaced below sufficiently below belt 88 to allow passage of the slats of the belt thereover. Here also, it should be understood that a wide variety of different door structures could be used in cooperation with conveyor 64 for limiting cob loss through aperture 46, including, but not limited to, accordion or folding doors, roll type doors, and flexible fabric doors, and thus the present invention is not to be interpreted as being limited to the door constructions shown.

Figure 10:
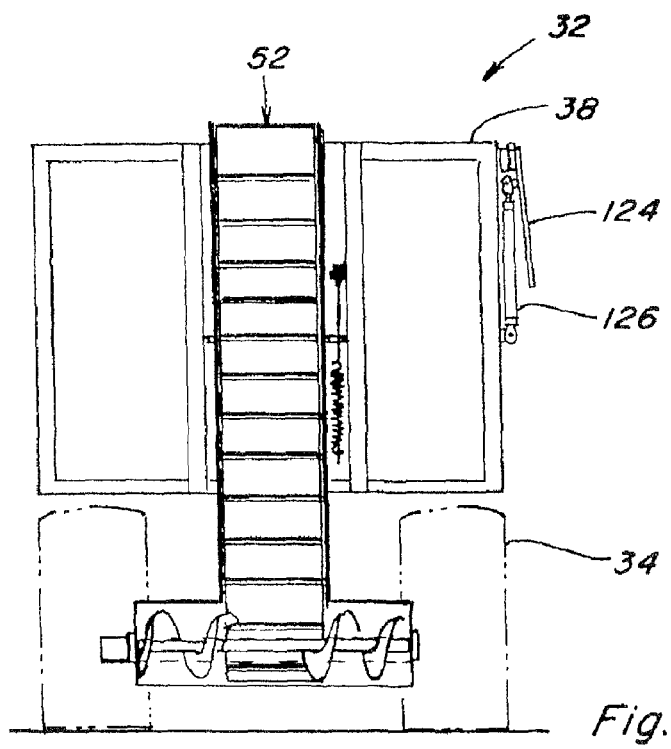
FIG. 10 is an end view of the cob collection device, illustrated in a lowered cob receiving position.
Figure 11:
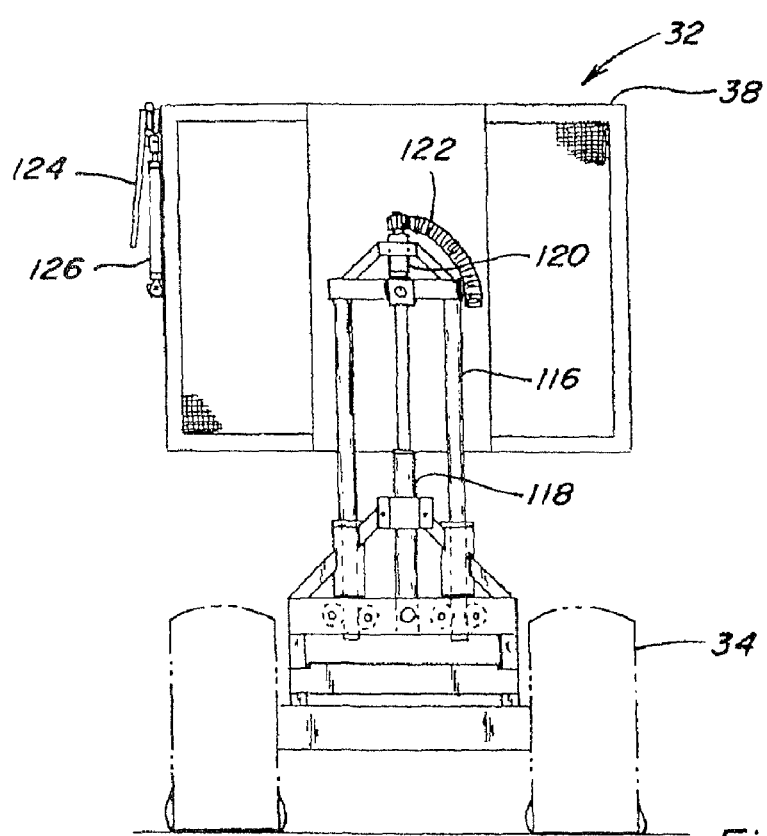
FIG. 11 is another end view of the cob collection device, illustrated raised above the cob receiving position.
Figure 12:
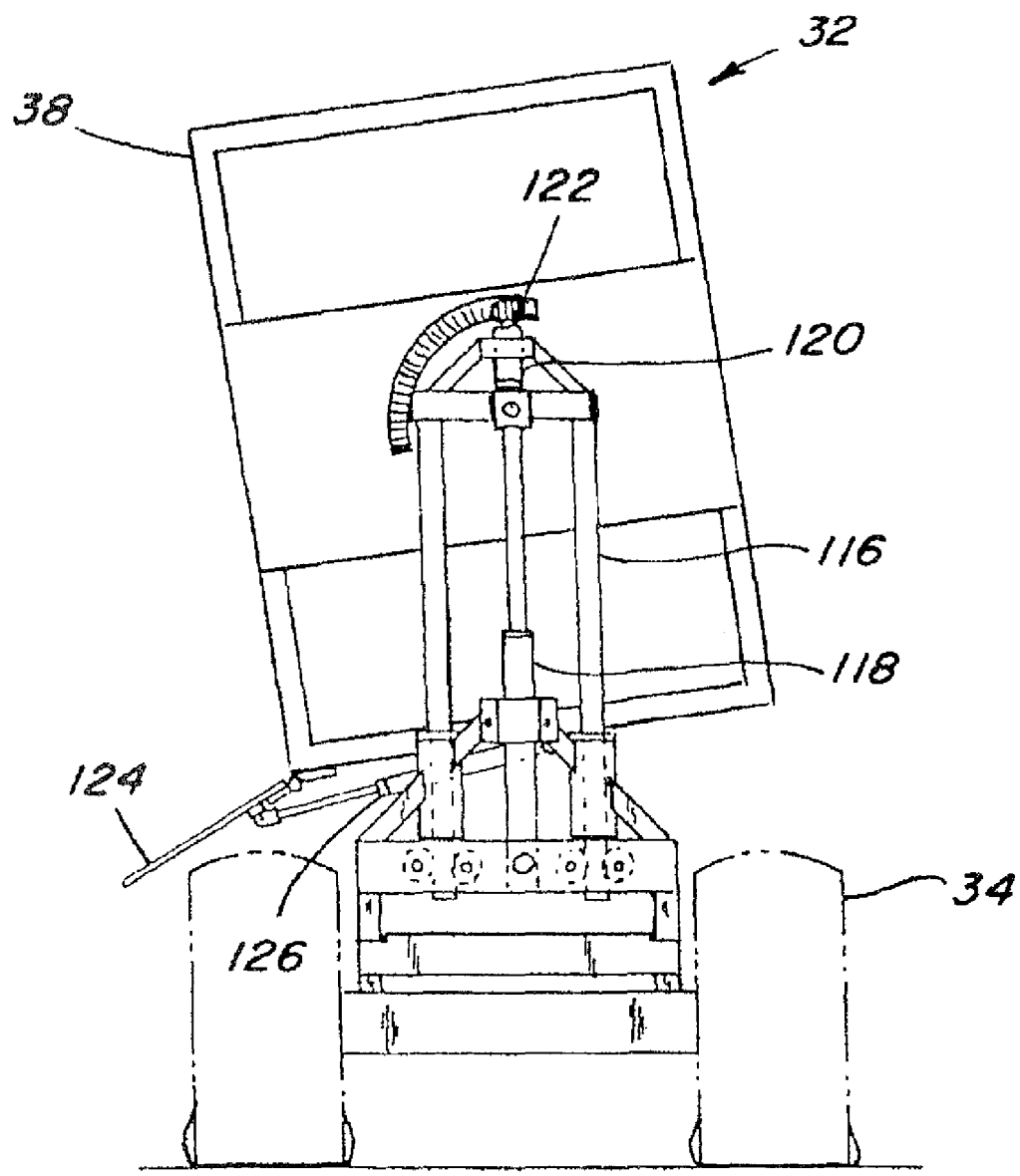
FIG. 12 is still another end view of the cob collection device, illustrated raised and tilted in an unloading position.

Referring also to FIGS. 10, 11 and 12, it will be required from time to time to unload the cobs from wall structure 38 of cob collection device 32, and structure 38 can be configured in a variety of ways for achieving this. As a non-limiting example, wall structure 32 can comprise a basket of a desired height, width and length, e.g., about equal in height to combine 20 with extensions of the grain tank lowered, supported on trailer 34 by lifting apparatus 116 of device 32 disposed at each end. Lifting apparatus 116 can comprise devices such as fluid cylinders 118 for raising or lifting structure 32 filled with cobs to a suitable height for unloading, such as shown in FIG. 11. Device 32 can also include tilting apparatus 120 operable for tilting structure 38 for unloading, such as a fluid motor disposed on lifting apparatus 116 and operable for rotating a pinion of a rotary rack and pinion mechanism 122. Structure 38 can also include an unload door 124 movable to an open position by an actuator 126, which can also comprise one or more fluid cylinders or the like, for guiding a flow of cobs sidewardly and outwardly away from trailer 34 as the structure is unloaded. Here, referring again to FIGS. 1 and 9, conveyor system 52 is configurable such that second conveyor 64 is movable to a position spaced from structure 38, to allow free upward and downward movement thereof between its cob receiving and unloading positions. Here, it should be noted that the device of the present invention can include a variety of other raise and tip type unloading cob holding structures, as well as others such as simple tilt unload configurations capable of transport under bridges, utilities, doorways, and the like.

Referring more particularly to FIG. 9, although device 32 is discussed above as configured for receiving just cobs and other crop residue from the cleaning system of combine 20, combine 20 can alternatively be configured for directing crop residue from threshing system 22 to device 32, as illustrated by arrangement in a conventional windrowing mode, wherein deflector panels in the rear of the combine are configured essentially to cause crop residue to bypass the spreader and flow onto first conveyor 60, as denoted by arrow W. As an example, this configuration could be used for applications wherein the threshing system of a combine is configured for directing cobs to the rear of the combine as opposed to the cleaning system.

Thus, it is apparent that the cob collection device 32 illustrated includes a conveyor system 52 operable for positively removing or cleaning attached husks from cobs after removal of corn therefrom by the combine 20 or another harvester, the conveyor system including an upwardly inclined conveyor 64 operably movable for distributing the de-husked cobs within a chamber 40 of a wall structure 38, and the conveyor system being positionable for allowing unloading of the wall structure, and stowable in cooperation therewith in a compacted manner to facilitate travel under bridges, utility wires, doorways and the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A device for removing attached husks from cobs and collecting the cobs after harvesting corn therefrom, comprising:

a cob collection device including an upstanding wall structure bounding an interior chamber configured for receiving the cobs, the upstanding wall structure including a predetermined wall having an upper region including an aperture therethrough connecting with the chamber;

a first conveyor having a first end, an opposite second end, and an array of husking rolls extending therebetween defining an upwardly facing surface configured and positioned for receiving a flow of the cobs including the husks attached thereto and conveying the cobs to the second end of the conveyor while positively removing the husks therefrom, each of the husking rolls bounding a gap smaller than the cobs connecting with a region below the first conveyor, each of the husking rolls being supported for rotation about an axis therethrough and connected to drive apparatus configured for drivingly rotating the husking rolls about the axes, respectively, the husking rolls including husking elements thereon configured such that when the husking rolls are rotated by the drive, the elements will grasp and detach the husks from the cobs and drive the detached husks through the gaps into the region below the first conveyor; and a second conveyor having a first end portion configured and positioned for receiving the cobs from the second end of the first conveyor, and an opposite second end portion, the second conveyor being inclined upwardly toward the second end portion and configured and operable for conveying the cobs upwardly and from the second end portion thereof, the second conveyor being supported for movement of the second end portion thereof through a range of positions between a first position adjacent to the aperture and external to the interior chamber, and a second position extending a predetermined maximum distance into the interior chamber through the aperture, the range of positions including different positions for distributing the cobs to different locations within the interior chamber, wherein the first conveyor and the second conveyor are carried on a trailer configured for towing behind a harvesting machine, for receiving the flow of the cobs therefrom, and the second conveyor is pivotable through the range of positions relative to the first conveyor and the trailer, wherein the cob collection device is supported on the trailer and configured for movement between a lowered cob receiving position, and a raised cob unloading position disposed a predetermined distance above the cob receiving position, and the second conveyor when in the first position will be disposed in spaced relation to the cob collection device when in the raised position.

2. The device of claim 1, wherein the husking elements comprise concave regions disposed about outer surfaces of the husking rolls, respectively.

3. The device of claim 1, further comprising a third conveyor disposed between the second end of the first conveyor and the first end portion of the second conveyor, the third conveyor being configured and operable for gathering the cobs conveyed to the second end of the first conveyor and feeding the gathered cobs onto the first end portion of the second conveyor.

4. The device of claim 1, wherein the upper region of the predetermined wall of the cob collection device includes a door configured and movable between a closed position covering the aperture, and an open position uncovering the aperture.

5. The device of claim 4, further comprising a mechanism configured and operable for automatically positioning the door in the closed position when the second end portion of the second conveyor is in the first position.

6. The device of claim 5, wherein the door and the second conveyor are configured such that the door is yieldably movable toward the open position by movement of the second end portion of the second conveyor to the second position.

\* \* \* \* \*